US009766895B2

(12) United States Patent
Wang et al.

(10) Patent No.: US 9,766,895 B2
(45) Date of Patent: *Sep. 19, 2017

(54) OPPORTUNITY MULTITHREADING IN A MULTITHREADED PROCESSOR WITH INSTRUCTION CHAINING CAPABILITY

(71) Applicant: Optimum Semiconductor Technologies, Inc., Tarrytown, NY (US)

(72) Inventors: Shenghong Wang, Yorktown Heights, NY (US); C. John Glossner, Nashua, NH (US); Gary J. Nacer, Morris Plains, NJ (US)

(73) Assignee: Optimum Semiconductor Technologies, Inc., Tarrytown, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/539,116

(22) Filed: Nov. 12, 2014

(65) Prior Publication Data

US 2015/0220346 A1    Aug. 6, 2015

Related U.S. Application Data

(60) Provisional application No. 61/936,428, filed on Feb. 6, 2014, provisional application No. 61/969,862, filed on Mar. 25, 2014.

(51) Int. Cl.
    *G06F 9/30*    (2006.01)
    *G06F 9/38*    (2006.01)
    *G06F 9/46*    (2006.01)

(52) U.S. Cl.
    CPC .......... *G06F 9/3826* (2013.01); *G06F 9/3851* (2013.01); *G06F 9/3853* (2013.01); *G06F 9/46* (2013.01)

(58) Field of Classification Search
    None
    See application file for complete search history.

(56) References Cited

U.S. PATENT DOCUMENTS 5,560,028 A * 9/1996 Sachs .................... G06F 9/3802
                                                    712/23
5,752,069 A * 5/1998 Roberts ................ G06F 9/3004
                                                    711/128

(Continued)

OTHER PUBLICATIONS

Shen et al.; Modern Processor Design: Fundamentals of Superscalar Processors; 2002; McGraw Hill.*

(Continued)

*Primary Examiner* — Corey S Faherty
(74) *Attorney, Agent, or Firm* — Lowenstein Sandler LLP

(57) ABSTRACT

A computing device determines that a current software thread of a plurality of software threads having an issuing sequence does not have a first instruction waiting to be issued to a hardware thread during a clock cycle. The computing device identifies one or more alternative software threads in the issuing sequence having instructions waiting to be issued. The computing device selects, during the clock cycle by the computing device, a second instruction from a second software thread among the one or more alternative software threads in view of determining that the second instruction has no dependencies with any other instructions among the instructions waiting to be issued. Dependencies are identified by the computing device in view of the values of a chaining bit extracted from each of the instructions waiting to be issued. The computing device issues the second instruction to the hardware thread.

22 Claims, 11 Drawing Sheets

(56) References Cited

U.S. PATENT DOCUMENTS

| | | | | |
|---|---|---|---|---|
| 5,822,558 A | * | 10/1998 | Tran | G06F 9/30036 |
| | | | | 712/213 |
| 5,974,534 A | * | 10/1999 | Noordeen | G06F 9/3802 |
| | | | | 712/213 |
| 6,253,306 B1 | * | 6/2001 | Ben-Meir | G06F 9/30101 |
| | | | | 712/207 |
| 6,842,848 B2 | * | 1/2005 | Hokenek | G06F 9/3867 |
| | | | | 712/215 |

OTHER PUBLICATIONS

USPTO, Office Action for U.S. Appl. No. 14/539,104, mailed Sep. 9, 2016 (14 pages).

* cited by examiner

| Chaining bit combination i1, i2 | Semantics |
| --- | --- |
| 0,0 | Hazard with next instruction group. Wait for completion of current instruction group before issue.<br>Hazard within instruction group. Issue instructions serially and wait for completion before next instruction issue. |
| 0,1 | No hazard with next instruction group. Issue vertically and propagate chain.<br>Hazard within instruction group. Issue instructions serially and wait for completion before next instruction issue. |
| 1,0 | Hazard with next instruction group. Wait for completion of current instruction group before issue.<br>No hazard within instruction group. Issue instructions horizontally and propagate chain. |
| 1,1 | No hazard with next instruction group. Issue vertically and propagate chain.<br>No hazard within instruction group. Issue instructions horizontally and propagate chain. |

FIGURE 3

| Chaining bit combination i1, i2, i3 | Semantics |
|---|---|
| x,x,0 | Irrespective of bits i1, and i2, if i3 is 0, it indicates a hazard with next instruction group. Wait for completion of current instruction group before issue. |
| x,x,1 | Irrespective of bits i1, and i2, if i3 is 0, it indicates no hazard with next instruction group. Issue vertically and propagate chain. |
| 0,0,x | Hazard between instruction 1 and 2 in instruction group. Issue them serially.<br>Hazard between instruction 2 and 3 in instruction group. Issue them serially. |
| 0,1,x | Hazard between instruction 1 and 2 in instruction group. Issue them serially.<br>No hazard between instruction 2 and 3 in instruction group. Issue instructions in parallel and propagate chain. |
| 1,0,x | No hazard between instruction 1 and 2 in instruction group. Issue instructions in parallel and propagate chain.<br>Hazard between instruction 2 and 3 in instruction group. Issue them serially. |
| 1,1,x | No hazard between instruction 1 and 2 in instruction group. Issue instructions in parallel and propagate chain.<br>No hazard between instruction 2 and 3 in instruction group. Issue instructions in parallel and propagate chain. |

FIGURE 4

| Chaining bit combination i1, i2, i3, i4 | Semantic |
|---|---|
| x,x,x,0 | Irrespective of bits i1, i2, and i3, if i4 is 0, it indicates a hazard with next instruction group. Wait for completion of current instruction group before issue. |
| x,x,x,1 | Irrespective of bits i1, i2, and i3, if i4 is 0, it indicates no hazard with next instruction group. Issue vertically and propagate chain. |
| 0,0,0,x | Hazard between all instructions in the instruction group. Issue all instructions serially. |
| 0,0,1,x | Hazard between instructions 2 and 3 in instruction group. Can issue instructions 1 and 2 in parallel and instructions 3 and 4 in parallel. |
| 0,1,0,x | Hazard between instructions 1 and 2 in instruction group. Have to issue instruction 1 separately. Can issue instructions 2, 3 and 4 in parallel. |
| 0,1,1,x | Hazard between instructions 3 and 4 in instruction group. Can issue instructions 1, 2 and 3 in parallel. Have to issue instruction 4 separately. |
| 1,0,0,x | No hazards between all instructions in the instruction group. Can issue all instructions in parallel. |
| 1,0,1,x | Have to issue instruction 1 separately. Must issue instructions 2, 3, and 4 in parallel. |
| 1,1,0,x | Must issue instructions 1, 2, and 3 in parallel. Have to issue instruction 4 separately. |
| 1,1,1,x | Must issue all instructions in the instruction group in parallel. |

FIGURE 5

OPPORTUNITY MULTITHREADING IN A MULTITHREADED PROCESSOR WITH INSTRUCTION CHAINING CAPABILITY

CROSS-REFERENCE TO RELATED APPLICATIONS

This application claims the benefit of U.S. provisional patent application 61/936,428 filed Feb. 6, 2014, and U.S. provisional patent application No. 61/969,862 filed Mar. 25, 2014, the disclosures of which are incorporated herein by reference in their entirety.

TECHNICAL FIELD

Embodiment of the present disclosure relate to a method and apparatus for processing instructions in a microprocessor environment. More specifically, the embodiments relate to multi-threading processing for a micro-processor that, when the micro-processor determines that a target hardware thread is empty or has no valid instructions to issue during a specific clock cycle, the micro-processor may issue instructions assigned to other hardware threads during the specified clock cycle.

BACKGROUND

Multi-threaded parallel processing technologies have be employed in high-performance processors to reduce the impact of high-speed processor instruction execution latency caused by long pipelines. Multi-threaded parallel processing technologies have improved instruction per cycle performance and efficiency over other processor designs. The most common type of multithreading in general purpose processors is simultaneous multi-threading technology (SMT). SMT has been employed in Intel's Hyper-Threading as described in "Intel Hyper-Threading Technology, Technical User's Guide," IBM's POWER5 as described in Clabes, Joachim et al. "Design and Implementation of POWER5 Microprocessor," Proceedings of 2004 IEEE International Solid-State Circuits Conference," Sun Microsystems's Ultra SPARC T2 as described in "Using the Cryptographic Accelerators in the UltraSPARC T1 and T2 Processors," *Sun BluePrints Online*, Sun Microsystems, retrieved 2008 Jan. 9, and the MIPS MT as described in "MIPS32 Architecture," Imagination Technologies, Retrieved 4 Jan. 2014.

Typical SMT-based processors have required each hardware thread to have its own set of registers and additional tracking logic at every stage of a pipeline within the SMT-based processor. This increases the size of hardware resources, specifically thread tracking logic needed to implement the design of the SMT-based processor. The thread tracking logic employed by the SMT-based processor is not only required to trace the execution of a hardware thread but also is required to determine whether the hardware thread has completed execution. Because the SMT-based processor may emply a large number of actively executing hardware threads, the size of CPU caches and associated translation look-aside buffers (TLB) need to be large enough to avoid hardware thread thrashing.

Although SMT technology may improve single-threaded performance, the above-identified control circuit complexity renders it difficult to apply SMT technology to embedded processors that require low-power consumption.

To overcome SMT control circuit complexity and reduce power consumption, other forms of multi-threading technologies have been developed. Block multi-threading and interleaved multithreading have been proposed. Unfortunately, block multi-threading technology has been restricted to microcontrollers and other low-performance processors. Interleaved multi-threading technology has simplified control circuitry but performance suffers when there are fewer software threads than available hardware threads in the processor. This technology been promoted in certain high-performance low-power processors. A representative example of Token-triggered multi-threading technology is described in U.S. Pat. No. 6,842,848.

Token-triggered multi-threading employs time sharing. Each software thread of execution is granted permission by the processor to executed in accordance with its own assigned clock cycles. Only one software thread per clock cycle is permitted to issue commands. A token is employed to inform a software thread as to whether the software thread should issue an instruction in the next clock cycle. This further simplifies hardware thread logic. No software thread may issue a second instruction until all software threads have issued an instruction. If a software thread has no instruction available to issue, a no operation (NOP) is issued by the hardware thread. Processor hardware ensures that each software thread has the same instruction execution time. The result of an operation may be completed within a specified guarantee period of time (e.g., clock cycles). Accordingly, no instruction execution related inspection and bypass hardware is needed in the processor design.

Token-trigger multi-threading technology simplifies the hardware issue logic of a multi-threaded processor and, accordingly, may achieve high performance with very little power consumption. However, compared with SMT technologies, the performance improvement of a token-trigger multi-threading processor is limited if there are fewer software threads having executable instructions during a clock cycle than available hardware threads. In such circumstances, hardware threads that do not have software threads assigned to them must issue NOPs.

Further, in order to avoid the interference between software threads and to simplify the hardware structure, conventional token triggered multithreading employs a time sharing strategy that can cause a low number of instructions to be executed per cycle. This reduces the processing speed of a single-threaded operation. For example, if the software instruction for context $T_1$ is not in the cache and requires a reload from external memory, due to the slow speed of the external memory, $T_1$ has to wait for many cycles to reload instructions. If context $T_0$ has an instruction ready, it still must wait to issue the instruction at clock cycle $C_1$. However, because of the structural limitations of the time shared datapath, clock cycle $C_1$ can only be used by context $T_1$ and in this case the hardware thread must issue a NOP.

In the worst case of a single software thread of execution, the performance of a corresponding conventional token-triggered processor is 1/T (where T is the number hardware threads). In a 10-threaded token-triggered processor running at 1 GHz, the performance of the processor is effectively reduced to 100 MHz.

To avoid thrashing and simplify the tracking circuit between hardware threads, in the Sandblaster 2.0 processor, each hardware thread has its own separate instruction memory as described in "The Sandblaster 2.0 Architecture and SB3500 Implementation Proceedings of the Software Defined Radio Technical Forum (SDR Forum '08)," Washington, D.C., October 2008. Unfortunately, the individual instruction memories cannot be shared between hardware threads. This may result in underutilized memory resources in addition to reduced performance when the number of software threads is fewer than the number of hardware threads.

SUMMARY

The above-described problems are addressed and a technical solution is achieved in the art by providing a method and apparatus for opportunity multithreading in a multi-threaded processor with instruction chaining capability. An example is described for instruction issue for a sequence of processor instructions that are chained together. The chained instructions that are associated with a specific hardware thread have a two-dimensional register array that stores a thread identification number (ID) of a software thread and the value identifying the instruction issued. These ID's may be stored separately. Therefore, each hardware thread of the multithreaded processor may issue instructions at any clock cycle that is assigned to other software threads when a target hardware thread is empty or has no valid instructions that may issue. This guarantees that data and architectural state do not become corrupted nor do processing results intermix. Instruction pre-validation logic may be employed to pre-detect the current and next software thread instruction issue location in a next clock cycle.

The above-described problems are addressed and a technical solution is achieved in the art by providing a computing device exhibiting opportunity multithreading with instruction chaining capability. The computing device determines that a current software thread of a plurality of software threads having an issuing sequence does not have a first instruction waiting to be issued to a hardware thread during a clock cycle. The computing device identifies one or more alternative software threads in the issuing sequence having instructions waiting to be issued. The computing device selects, during the clock cycle by the computing device, a second instruction from a second software thread among the one or more alternative software threads in view of determining that the second instruction has no dependencies with any other instructions among the instructions waiting to be issued. Dependencies are identified by the computing device in view of the values of a chaining bit extracted from each of the instructions waiting to be issued. The computing device issues the second instruction to the hardware thread.

To determine that the second instruction has no dependencies with any other instructions among the instructions waiting to be issued, the computing device groups the first instruction and the other instructions among the instructions waiting to be issued into a group of instructions. The computing device extracts a designated bit from each instruction of the group of instructions to produce a sequence of chaining bits. The computing device decodes the sequence of chaining bits. The computing device identifies zero or more instruction dependencies among the group of instructions in view of the decoded sequence of chaining bits. The computing device determines that the second instruction is associated with zero dependencies of the zero or more instruction stream dependencies.

In an example, the sequence of chaining bits is decoded without decoding any of the instructions in the group of instructions.

In an example, an identified dependency between two or more instructions within the group of instructions is a control dependency or a data dependency.

In an example, the computing device may encode the designated bit in each instruction with the zero or more dependencies among the group of instructions to produce the sequence of chaining bits.

In an example, the computing device may assign a first index to the hardware thread corresponding to a position of the second software thread in the sequence. The computing device may assign a second index to the hardware thread corresponding to the clock cycle. The computing device may employ the first index and the second index to identify the second software thread from which the second instruction originally issued. Responsive to determining that the current software thread has the first instruction waiting to be issued to the hardware thread during the clock cycle, the computing device may issue the first instruction to the hardware thread.

In another example, the computing device may assign a first index to the hardware thread corresponding to a position of the current software thread in the issuing sequence. The computing device may assign a second index to the hardware thread corresponding to the clock cycle. The computing device may employ the first index and the second index to identify the current software thread from which the first instruction originally issued.

In an example, the issuing sequence may be initially a token-triggered multi-threading sequence.

In an example, the number of software threads of the plurality of software threads may be fewer than the number of available hardware thread units.

BRIEF DESCRIPTION OF THE DRAWINGS

The present invention may be more readily understood from the detailed description of examples presented below presented below considered in conjunction with the attached drawings and in which like reference numerals refer to similar elements.

FIG. 3 shows one example of a set of instruction chaining semantics for a dual-issue pipelined processor.

FIG. 4 shows one example of semantics for instruction chaining in a 3-issue processor.

FIG. 5 shows one example of a set of instruction chaining semantics for a 4-issue processor.

It is to be understood that the attached drawings are for purposes of illustrating the concepts of the invention and may not be to scale.

DETAILED DESCRIPTION

Examples of the present disclosure describe a multi-threaded computer processor and a method of operating the multithreaded computer processor that minimizes unused clock cycles in the multithreaded processor when there are fewer software threads than hardware thread units. Unused clock cycles may arise when an assigned hardware thread unit must issue a NOP. The examples of the present disclosure provide a method and a multithreaded computer processor that may issue waiting instructions to multiple hardware thread units without requiring all previous hardware thread units to first issue NOPs, as would be the case with token triggered multithreading. The method, called "opportunity multi-threading," controls the instruction issue sequence by associating a software thread with a number of hardware thread units by providing a two-dimensional identification register array. In every pipeline stage, a thread identifier (ID) may be employed to identify the software thread from which an instruction originally issued. This information may be stored in pipeline registers and may be employed to identify and track an execution state of a multi-threaded instruction at every pipeline stage. This disambiguates between multiple software threads and instructions issued in different pipelines by the same hardware thread.

Figure 1:
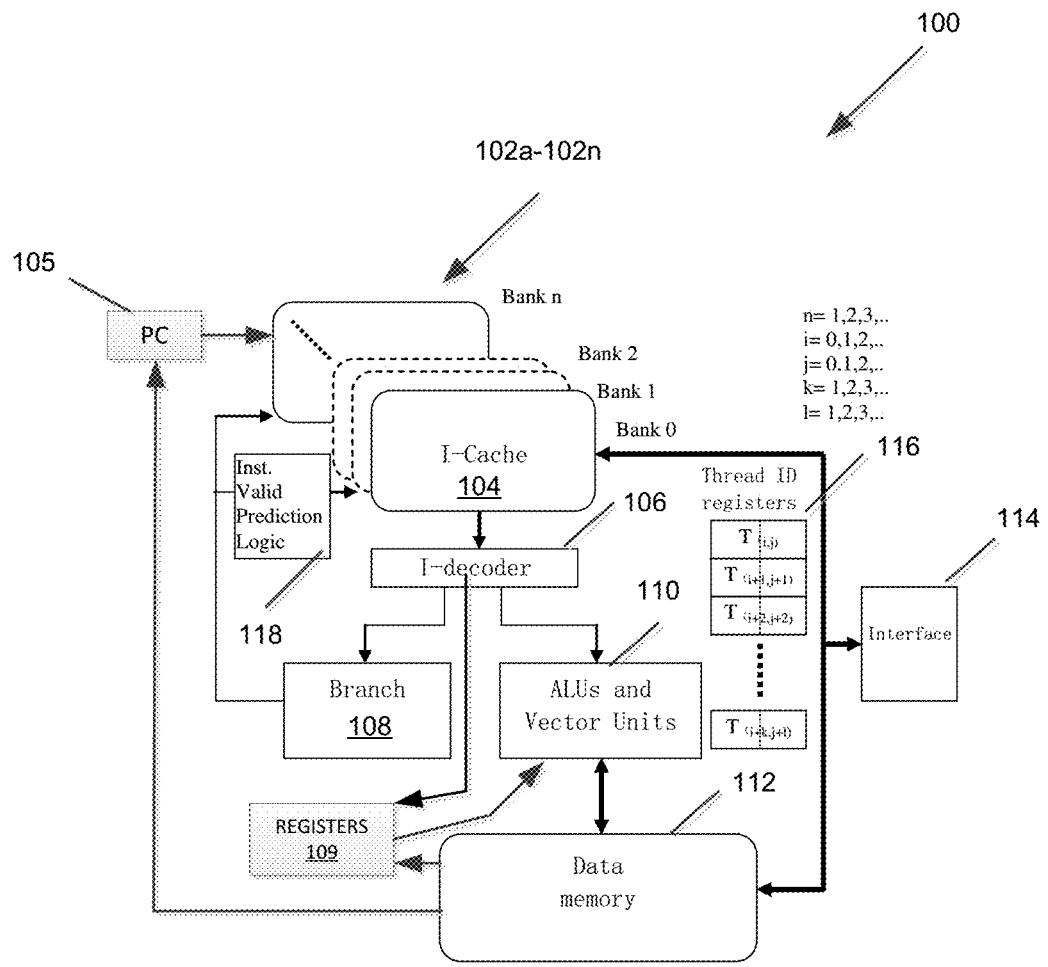
FIG. 1 shows one example of a hardware thread unit within a multithreaded processor that minimizes unused clock cycles when there are fewer executable software threads than available hardware thread units, in which examples of the present disclosure may operate.

FIG. 1 shows one example of a hardware thread unit of a multithreaded processor 100 that minimizes unused clock cycles when there are fewer executable software threads than available hardware thread units, in which examples of the present disclosure may operate. In an example, the multithreaded processor 100 may comprise a plurality of hardware thread units 102a-102n. Each of the hardware thread units 102a-102n may comprise at least one instruction memory (I-Cache) 104, a program counter (PC) 105, an instruction decoder (I-decoder) 106, a program branch controller (Branch) 108 (hereinafter "the instruction issue controller 108") one or more arithmetic logic units (ALUs) 110, a data memory 112, and an interface bus 114 to (main random-access) memory (not shown). The multithreaded processor 100 may be further provided with a set of two-dimensional thread identification (ID) registers 116 or two independent thread identification registers 116, and instruction validity prediction logic 118. Each of the hardware thread units 102a-102n may be provided with a set of execution program registers (not shown) required for the implementation of a program.

In one example, "groups" of instructions may be read from the instruction memory (I-Cache) 104 and decoded by the instruction decoder (I-decoder) 106, respectively. The decoded information may be employed to generate control signals exiting the instruction issue controller 108 that control the operations of data path and pipelines. Direct register references may be transmitted to a register file 109 (labeled registers 109) and data contained within the register file 109 may be transmitted to the one or more arithmetic logic units (ALUs) 110 (which, in an example, may comprise instruction pipelines and execution units (not shown)). The results of an operation, stored in the data memory 112, may be written back to the register file 109. The program counter (PC) 105 may be updated and the next instruction may be fetched from the instruction memory (I-Cache) 104.

In one example, the multithreaded processor 100 may be provided with instruction validity prediction logic 118. The instruction validity prediction logic 118 may be configured to determine if any dependencies exits between instructions ready to be issued in an issuing sequence during a clock cycle. The dependency information provided by the instruction validity prediction logic 118 may be encoded and output in the form of "chaining bits" used to determine in advance if a current software thread and any additional software threads have valid instructions that can be issued in the next clock cycle. In an example, if the next hardware thread unit (e.g., 102a) has no valid executable instructions in next cycle but the current hardware thread unit (e.g., 102b) has instructions waiting that may issue, then the logic of the instruction validity prediction logic 118 may permit the current hardware thread to issue an instruction in the next clock cycle.

It will be appreciated by those skilled in the art that, in one example, one or more of the elements 104-118 of the multithreaded processor 100 may be shared across the hardware thread units 102a-102n. For example, one or more of the element 104-118 (e.g., the one or more arithmetic logic units (ALUs) 110, the instruction memory (I-Cache) 104, the data memory 112, etc.) may be shared among the hardware thread units 102a-102n when the one or more of the elements 104-118 do not represent processor state. Conversely, in an example, any of the elements 104-118 that represents processor state need to be replicated for each of the hardware thread units 102a-102n.

Instruction chaining employs one bit per instruction, referred to hereinafter as the "chaining bit," to indicate both parallelism and inter-instruction dependencies in a sequence of processor instructions. As used herein, an instruction refers to an independently addressable unit with operation and operand phrases (See in Gerrit A. Blaaw and Frederick P. Brooks, Jr., "Computer Architecture: Concepts and Evolution," Addison Wesley, first edition, February 1997, page 128). Multiple instructions may be grouped together to form an instruction group that may be fetched together. At runtime, the processor reassembles the chaining bits from the instructions in an instruction group to decode dependencies and parallelism within the instruction stream efficiently without having to decode the individual instructions. This information may be employed to generate necessary pipeline control signals for instruction issue, eliminating the need for complex inter-instruction dependency checking hardware or NOP instructions in pipelined processor architectures. This procedure may co-exist with pipeline effects that are not visible to programmers such as long load pipeline stalls, branch resolution, and other long latency operations. Since each instruction is independently addressable, jumping into the middle of an instruction group may be permitted. However, when jumping into the middle of the instruction group, the dependency bits for the entire group need to be reconstructed for chaining bit decoding. If a compiler analyzes the instruction dependencies and generates the chaining bits, then a programmer effectively does not see any pipeline effects and can program the machine without regard to hazards.

While it may be possible to define a set of chaining bits to be compatible with different processor implementations, for most implementations, the chaining bits may be implementation dependent: their semantics may be interpreted only on the processor for which they were programmed. In an example, a single-issue pipelined processor may have only two interpretations of one chaining bit. A "0" value denotes no chaining and a "1" value denotes that the instruction may be chained with the next instruction. Thus, in a single-issue pipelined processor, the chaining bit may indicate only whether instructions are independent and with or without hazards. In another example, the logic of the chaining bit may be reversed to interpret a "0" to denote chaining and a "1" to denote no chaining.

Instruction Chaining in a Single-Issue Pipelined Processor

Figure 2:
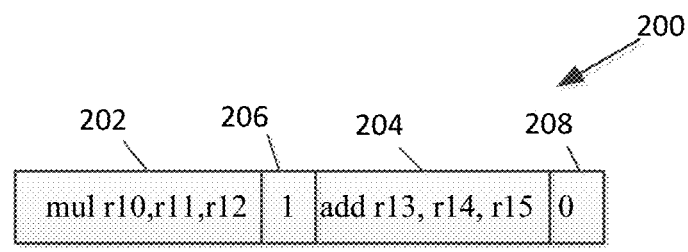
FIG. 2 shows an example of two independent instructions, each of the instructions having a corresponding bit reserved for chaining information.

The simplest case of chaining is a single-issue pipelined processor that can issue one instruction per clock cycle if there are no inter-instruction dependencies. FIG. 2 shows an example 200 of two independent instructions 202, 204, each of the instructions 202, 204 having a corresponding bit 206, 208, reserved for chaining information. The chaining bit 206 of the multiply instruction 202 is set to 1 because the add instruction 204 is independent and may be executed in parallel. Any number of bits may be chained together based on the capabilities of a particular processor.

In an example, for a typical pipelined-processor, if inter-instruction dependencies exist, the pipeline must stall until the dependencies are resolved. If the chaining bit is set to "1", this is an indication that the next instruction has no control or data dependencies with any instructions within the current instruction chain. Hence, the instruction may be issued immediately. If the chaining bit is set to "0", this is an indication that the next instruction has control and/or data dependencies with at least one instruction within the current instruction chain. Hence, the execution of this instruction cannot commence until all instructions in the current chain complete execution and exit the pipeline.

Instruction Chaining in a Dual-Issue Pipelined Processor

A dual-issue pipelined processor may be configured to issue two instructions (an instruction group) every cycle if there are no instruction dependencies. If there is a dependency between instruction groups, the pipeline is stalled until the dependency is resolved. If there is a dependency within the instruction group, then the instructions within the instruction group are issued serially, i.e., the first instruction is issued and the second instruction is stalled until the first instruction completes execution and exits the pipeline.

Each instruction in the instruction group has a chaining bit. Hence, in a dual-issue processor, there are two chaining bits available per instruction group and thus 4 scenarios can be encoded. In an example, one chaining bit may be used to indicate vertical parallelism (inter-group parallelism) and the second chaining bit may be used to indicate horizontal parallelism (intra-group parallelism).

FIG. 3 shows one example of a set of instruction chaining semantics for a dual-issue pipelined processor. Chaining bits i1 and i2 may be taken from the first and second instructions in the instruction group, respectively. Chaining bit i1 is the intra-group parallelism bit. If the intra-group parallelism bit is 1, then the second instruction in the group can be issued in parallel with the first instruction in the group. If the intra-group parallelism bit is 0, then the second instruction has to wait until the first instruction has completed execution. Chaining bit i2 is the inter-group parallelism bit. If the inter-group parallelism bit is 1, then the next execution group can enter the pipeline in the next clock cycle behind the current executing group. If the inter-group parallelism bit is 0, then the next execution group has to wait until the current execution group has completed execution.

Instruction Chaining in a 3-Issue Pipelined Processor

A 3-issue pipelined processor may issue three instructions (an instruction group) every cycle if there are no instruction dependencies. If there is a dependency between instruction groups, the pipeline is stalled until the dependency is resolved. If there is a dependency within the instruction group, then the instructions within the instruction group are issued serially or partially parallel as indicated by the chaining bits. Each instruction in the instruction group has a single chaining bit. Hence, in a 3-issue processor, there are three chaining bits available per instruction group yielding 8 semantic combinations. One chaining bit may be used to indicate vertical parallelism (across instruction groups) and the other two chaining bits may be used to indicate horizontal parallelism (within the instruction group).

FIG. 4 shows one example of semantics for instruction chaining in a 3-issue processor. The example of semantics for instruction chaining for the chaining bit combinations indicated in FIG. 4 offers the maximum flexibility in horizontal parallelism. A value of x in FIG. 4 indicates the chaining bit can be a 0 or a 1. Chaining bits i1, i2 and i3 may be taken from the first, second and third instructions in the instruction group, respectively. Chaining bits i1 and i2 are the intra-group parallelism bits. If i1 or i2 is 1, then the next instruction in the group can be issued in parallel with the current instruction in the group. If i1 or i2 is 0, then the next instruction has to wait until the currently executing instructions have completed execution. Chaining bit i3 is inter-group parallelism bit. If i3 is 1, then the next execution group can enter the pipeline in the next clock cycle behind the current execution group. If i3 is 0, then the next execution group needs to wait until the current execution group has completed execution.

If full flexibility in horizontal parallelism is not necessary, two chaining bits may be sufficient to encode vertical and horizontal parallelism (all three instructions issued together or not). The third chaining bit may be used to encode additional information.

Instruction Chaining in a 4-Issue Pipelined Processor

A 4-issue pipelined processor issues four instructions every cycle if there are no instruction dependencies. If there is a dependency between instruction groups, the pipeline may be stalled until the dependency is resolved. If there is a dependency within the instruction group, then the instructions within the instruction group may be issued serially or partially parallel as indicated by the chaining bits.

Each instruction in the instruction group has a single chaining bit. Hence, in a 4-issue processor, there are four chaining bits available per instruction group, yielding 16 semantic combinations. One chaining bit may be used to indicate vertical parallelism (across instruction groups) and the other three chaining bits may be used to indicate other possibilities for horizontal execution (executing instructions within instruction group).

FIG. 5 shows one example of a set of instruction chaining semantics for a 4-issue processor. A value of x in FIG. 5 indicates the chaining bit can be a 0 or a 1. Chaining bits i1, i2, i3, i4 may be taken from the first, second, third and fourth instructions in the instruction group, respectively. Chaining bit i4 is an inter-group parallelism bit. If i4 is 1, then the next execution group can enter the pipeline in the next clock cycle behind the current execution group. If i4 is 0, then the next execution group has to wait until the current execution group has completed execution. Chaining bits i1, i2, and i3 may be used to indicate intra-group parallelism. In an example, some combinations of chaining bits i1, i2, and i3 indicate possible parallelism within the instructions in the group (001x, 010x, 011x, 100x) and other combinations indicate mandatory parallelism within instructions in the group (101x, 110x, 111x). Possible parallelism exposes the available parallelism, but the processor may or may not use it. The results remain the same whether the instructions are executed in parallel or sequentially. Mandatory parallelism indicates that the instructions must be executed in parallel to obtain desired results.

By employing chaining, dependencies may be encoded across a sequence of instructions. In the example of FIG. 4, a 3-issue machine may employ three chaining bits (one from each instruction) to encode 8 possible dependency types. In this sense, chaining may be extended to groups of instructions. For example, "000" decoded from the chaining bits of three instructions may be interpreted as all of the instructions within a current group are not chained and the next group of instructions may not be chained with the current group of instructions.

In one example, in a multiple issue processor, one of the chaining bits may be reserved for inter-group parallelism to indicate whether a next group of instructions after a current group of instruction contains any control or data dependencies with the current group of instructions. If there are no dependencies, the next group of instructions may be issued down the pipeline concurrently with the current group of instructions without any pipeline stalls. The other chaining bits within an instruction group may describe intra-group parallelism information that indicates parallelism and dependencies between the instructions in the current instruction group.

Chaining bits may also encode performance improvement techniques, such as informing a processor to use a bypass value rather than reading it again from a register file. In some situations, this may reduce the power dissipated by the processor.

Advantageously, both parallelism and dependencies may be encoded across a group of instructions. Chaining bits may be employed to encode inter-instruction dependencies, inter-group dependencies, and performance optimizations that during execution help to quickly generate the necessary pipeline control signals in a pipelined-processor, thereby eliminating the need for complex dependency checking hardware.

Returning to FIG. 1, in one example, the instruction validity prediction logic 118 may be configured to determine whether a current software thread of a plurality of software threads having an issuing sequence does not have a first instruction waiting to be issued to a hardware thread unit during a clock cycle. The instruction validity prediction logic 118 may be configured to identify one or more alternative software threads in the issuing sequence having instructions waiting to be issued. The instruction validity prediction logic 118 may be configured to select, during the clock cycle, a second instruction from a second software thread among the one or more alternative software threads in view of determining that the second instruction has no dependencies with any other instructions among the instructions waiting to be issued. Dependencies may be identified in view of the values of a chaining bit extracted from each of the instructions waiting to be issued. The instruction issue controller 108 may be configured to issue the second instruction to the hardware thread unit.

In an example, to determine that the second instruction has no dependencies with any other instructions among the instructions waiting to be issued, the instruction validity prediction logic 118 may group the first instruction and the other instructions among the instructions waiting to be issued into a group of instructions. The instruction validity prediction logic 118 may extract a designated bit from each instruction of the group of instructions to produce a sequence of chaining bits. The instruction validity prediction logic 118 may decode the sequence of chaining bits. The sequence of chaining bits may be decoded without decoding any of the instructions in the group of instructions. The instruction validity prediction logic 118 may identify zero or more instruction dependencies among the group of instructions in view of the decoded sequence of chaining bits. In an example, any identified dependency between two or more instructions within the group of instructions may be a control dependency or a data dependency. The instruction validity prediction logic 118 may then determine that the second instruction is associated with zero dependencies of the zero or more instruction stream dependencies.

In one example, the multithreaded processor 100 may be further provided with the set of two-dimensional thread identification (ID) registers 116 or two independent thread identification registers 116 (hereinafter "the thread ID registers 116"). This information may be made available at every pipeline stage. The multithreaded processor 100 may employ the thread ID registers 116 to track instruction execution of a plurality of software threads at every pipeline stage to ensure that instructions are properly reassembled and the state is assigned to the original software thread to which that the instruction belongs.

In an example, the instruction issue cycle for each software thread is no longer required to be fixed and hardware thread units are not required to issue NOPs if valid instructions are available to be issued from any software thread.

If an instruction in a specific hardware thread unit (e.g., 102a) experiences a cache miss, the cache miss does not block other instructions from issuing on clock cycles assigned to the hardware thread unit that experienced the cache miss. Each instruction, regardless of which clock cycle it issued in, carries a unique thread identifier (ID) that permits the instruction to be associated with the original software thread from which the instruction originated.

If there are valid instructions waiting to issue in a next clock cycle, then a hardware thread unit (e.g., 102a) may issue instructions from a software thread assigned to the hardware thread unit (e.g., 102a). If there are no waiting instructions, then issue logic may assign an instruction from the current software thread.

Since there is an opportunity that each software thread can issue instructions multiple times during a thread cycle, to avoid incorrect results, the thread ID registers 116 are provided for tracking and identifying the software threads and instructions issued at different clock cycles.

In one example, the instruction issue controller 108 may be configured to assign a first index to the hardware thread unit corresponding to a position of the second software thread in the sequence. The instruction issue controller 108 may be configured to assign the second index to the hardware thread unit corresponding to the clock cycle. The instruction issue controller 108 may be configured to employ the first index and the second index to identify the second software thread from which the second instruction originally issued. In one example, responsive to the instruction issue controller 108 determining that the current software thread has the first instruction waiting to be issued to the hardware thread unit during the clock cycle, the instruction issue controller 108 may issue the first instruction to the hardware thread unit.

In another example, the instruction issue controller 108 may be configured to assign a first index to the hardware thread unit corresponding to a position of the current software thread in the issuing sequence. The instruction issue controller 108 may be configured to assign a second index to the hardware thread unit corresponding to the clock cycle. In one example, the instruction issue controller 108 may employ the first index and the second index to identify the current software thread from which the first instruction originally issued.

Figure 6:
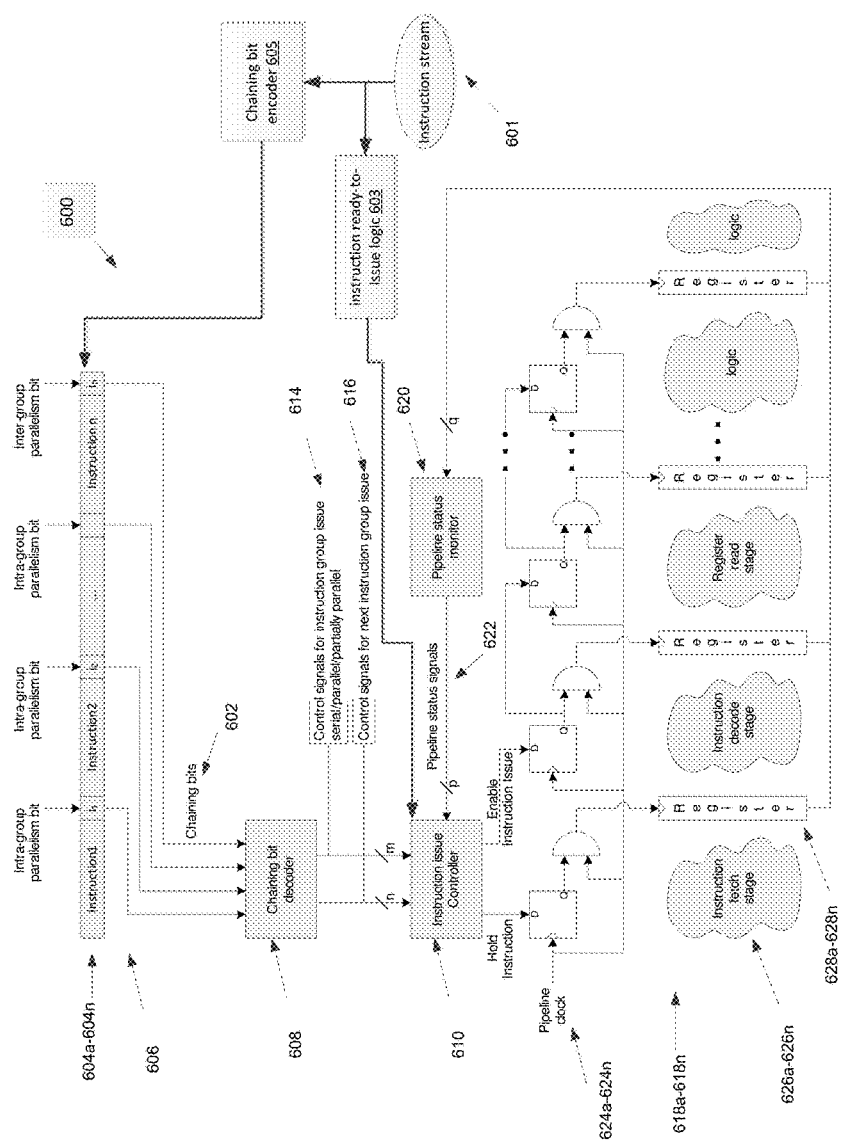
FIG. 6 shows an instruction dependency prediction circuit to extract chaining bits from instructions in an instruction group, decode the extracted chaining bits, and generate pipeline control signals, in which examples of the present disclosure may operate.

FIG. 6 shows one example of the instruction dependency prediction circuit 118. The instruction dependency prediction circuit 118 may comprise instruction ready-to-issue logic 603, a chaining bit encoder 605, and a chaining bit decoder 608. The instruction ready-to-issue logic 603 may be configured to identify whether each software thread of a sequence of software threads having an issuance sequence (e.g., a round-robin token-triggered threading sequence) has instructions waiting to be issued during a specific clock cycle. The ready-to-issue logic 603 may be further configured to group the set of instruction waiting to issue into a group of instructions (hereinafter "the instruction group 606").

The chaining bit encoder 605 may be configured receive the instruction group 606 from an instruction stream 601 identified by the instruction ready-to-issue logic 603. The chaining bit encoder 605 may be configured to identify zero or more instruction stream dependencies among the received instruction group 606. The chaining bit encoder 605 may be configured to encode a bit in each instruction of the received instruction group 606 to produce a sequence of chaining bits containing the zero or more encoded instruction stream dependencies among the instruction group 606.

The chaining bit decoder 608 may be configured to extract chaining bits 602 from instructions 604a-604n in an instruction group 606, decode the extracted chaining bits 602, and generate pipeline control signals for enabling dependency information, parallelism information, and performance optimizations to be decoded without examining the underlying instructions encoded in a sequence of instructions. In FIG. 6, the chaining bit decoder 608 may be configured to decode the semantics of the encoded chaining bit combinations received from the extracted chaining bits 602 and may be configured to generate appropriate controls for the instruction issue controller 610.

In one example, the chaining bit decoder 608 may be configured to extract a designated bit from each instruction of the group of instructions (e.g., the instructions 604a-604n in an instruction group 606) to produce a sequence of chaining bits 602. The chaining bit decoder 608 may decode the sequence of chaining bits 602. The sequence of chaining bits 602 may be decoded without decoding any of the instructions in the group of instructions (e.g., the instructions 604a-604n in an instruction group 606). The chaining bit decoder 608 may identify zero or more instruction dependencies among the group of instructions (e.g., the instructions 604a-604n in an instruction group 606) in view of the decoded sequence of chaining bits 602. In an example, any identified dependency between two or more instructions within the group of instructions (e.g., the instructions 604a-604n in an instruction group 606) may be a control dependency or a data dependency. The chaining bit decoder 608 may then determine that one or more instructions (e.g., a second instruction) in the instruction group 606 is associated with zero dependencies of the zero or more instruction stream dependencies.

The instruction issue controller 610 may be configured to control the issuance of instructions within an instruction group (serial, parallel, or partially parallel) using the control signals 614 or the instruction issue controller 610 may control the issuance of the next instruction group using the control signals 616. The instruction issue controller 610 may be configured to receive the commands from the chaining bit decoder 608 and may generate the pipeline control signals to stall instruction issue in pipeline stages 618a-618n (comprising, for example, pipeline clocks 624a-624n, pipeline stage logic 626a-626n, and corresponding registers 628a-628n), if necessary. The pipeline status monitor 620 may be configured to monitor instructions currently executing in the pipeline stage 618 and provide feedback 622 to the instruction issue controller 610 to restart instruction issue after a stall. An important consideration in examples of the present disclosure, and unlike VLIW and visible pipeline designs, is that the pipeline controls are generated such that a compiler or a programmer does not see any pipeline effects.

In one example, the instruction issue controller 610 may be configured to determine that a current software thread of a plurality of software threads having an issuing sequence does not have a first instruction waiting to be issued to a hardware thread unit (e.g., 102a) during a clock cycle based on the control signals 616 received from the ready-to-issue logic 603. The instruction issue controller 610 may be configured to identify one or more alternative software threads in the issuing sequence having instructions waiting to be issued based on the control signals 616 received from the chaining bit decoder 608. The instruction issue controller 610 may be configured to select, during the clock cycle, a second instruction from a second software thread among the one or more alternative software threads in view of the chaining bit decoder 608 determining that the second instruction has no dependencies with any other instructions among the instructions waiting to be issued based on the control signals 616 received from the chaining bit decoder 608. Dependencies may be identified by the chaining bit decoder 608 in view of the values of a chaining bit extracted from each of the instructions waiting to be issued by the chaining bit decoder 608. In an example, the instruction issue controller 610 may be configured to issues the second instruction to the hardware thread unit.

Figure 7:
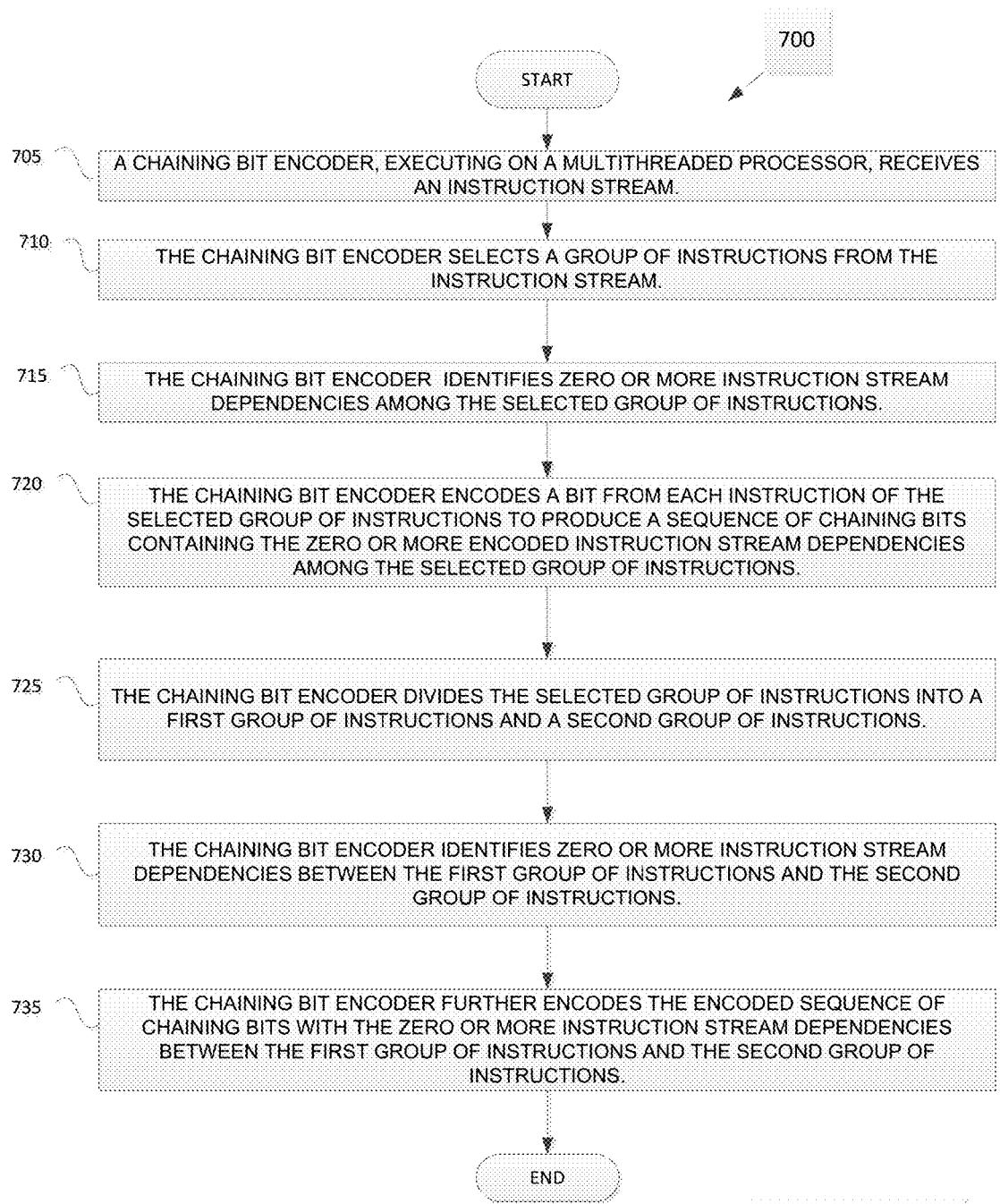
FIG. 7 is a flow diagram illustrating an example of a method for enabling dependency information, parallelism information, and performance optimizations to be encoded in a sequence of instructions.

FIG. 7 is a flow diagram illustrating an example of a method 700 for enabling dependency information, parallelism information, and performance optimizations to be encoded in a sequence of instructions. The method 700 may be performed, for example, by chaining bit encoder 605 of the computer processor of FIGS. 1 and 6, or by other types of computer processors and may comprise hardware (e.g., circuitry, dedicated logic, programmable logic, microcode, etc.), software (e.g., instructions run on a processing device), or a combination thereof. In one example, the method 700 may be performed by the chaining bit encoder 605 of the computer processor 100 of FIGS. 1 and 6.

As shown in FIG. 7, to permit enabling dependency information, parallelism information, and performance optimizations to be encoded in a sequence of instructions, at block 705, a chaining bit encoder 605, executing on the multithreaded processor 100, receives an instruction stream 601. At block 710, chaining bit encoder 605 selects a group of instructions (e.g., the instructions 604a-604n in the instruction group 606) from the instruction stream 601.

At block 715, the chaining bit encoder 605 identifies zero or more instruction stream dependencies among the selected group of instructions (e.g., the instructions 604a-604n in the instruction group 606). At block 720, the chaining bit encoder 605 encodes a bit from each instruction of the selected group of instructions (e.g., the instructions 604a-604n in the instruction group 606) to produce a sequence of chaining bits 602 containing the zero or more encoded instruction stream dependencies among the group of instructions (e.g., the instructions 604a-604n in the instruction group 606).

In one example, the encoded sequence of chaining bits 602 may indicate that two or more instructions in the selected group of instructions (e.g., the instructions 604a-604n in the instruction group 606) may be executed in parallel. In another example, the encoded sequence of chaining bits 602 may indicate that two or more instructions in the selected group of instructions (e.g., the instructions 604a-604n in the instruction group 606) must be executed in series. In another example, the encoded sequence of chaining bits 602 may indicate that two or more instructions in the selected group of instructions (e.g., the instructions 604a-604n in the instruction group 606) must be executed in parallel. In another example, the decoded sequence of chaining bits 602 may indicate that the selected group of instructions (e.g., the instructions 604a-604n in the instruction group 606) may be executed partially in parallel and partially in series.

In an example, the number of instructions chaining bit encoder 605 to place in the selected group of instructions (e.g., the instructions 604a-604n in the instruction group 606) may be based on the issue width of the processor (e.g., the processor 100) on which the selected group of instructions are to be executed.

In an example, the chaining bit encoder 605 may identify a dependency between two or more instructions within the selected group of instructions (e.g., the instructions 604a-604n in the instruction group 606) as a control dependency or a data dependency.

In an example, one or more bits in the encoded sequence of chaining bits 602 may be operable to optimize performance of an executable program. The encoded sequence of chaining bits 602 may be operable to function as pipeline control signals.

In one example, at block 725, the chaining bit encoder 605 may divide the selected group of instructions into a first group of instructions and a second group of instructions. At block 730, the chaining bit encoder 605 may identify zero or more instruction stream dependencies between the first group of instructions and the second group of instructions. At block 735, the chaining bit encoder 605 may further encode the encoded sequence of chaining bits with the zero or more instruction stream dependencies between the first group of instructions and the second group of instructions. In an example, a bit in the encoded sequence of chaining bits may indicate that the first group of instructions may be executed in parallel with the second group of instructions.

Figure 8:
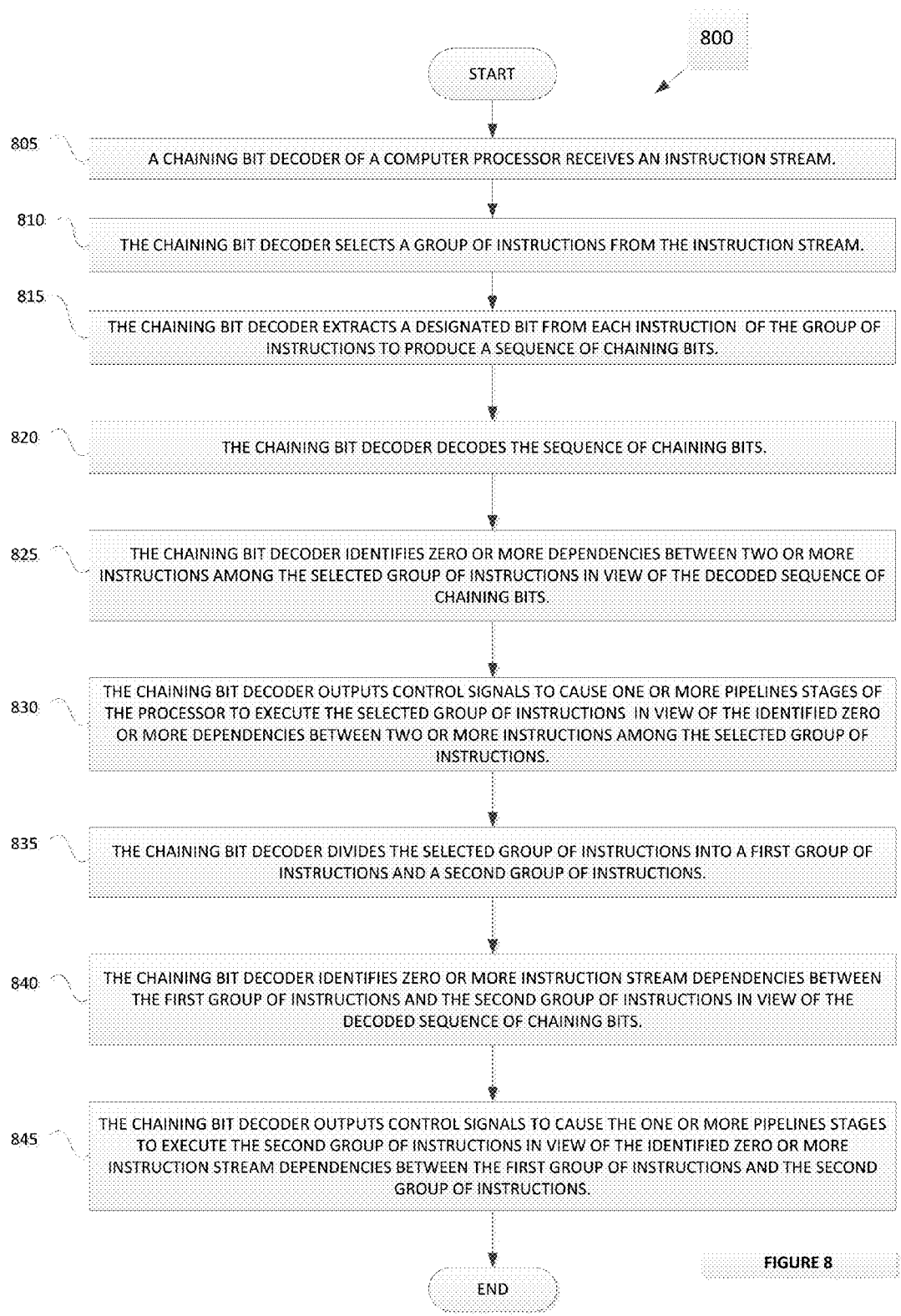
FIG. 8 is a flow diagram illustrating an example of a method for enabling dependency information, parallelism information, and performance optimizations to be decoded without examining the underlying instructions encoded in a sequence of instructions.

FIG. 8 is a flow diagram illustrating an example of a method 800 for enabling dependency information, parallelism information, and performance optimizations to be decoded without examining the underlying instructions encoded in a sequence of instructions. The method 800 may be performed by the multithreaded processor 100 of FIG. 1 and, in one example, may be performed primarily by the chaining bit decoder 608 of the instruction dependency prediction circuit 118 (e.g., circuitry, dedicated logic, programmable logic, microcode, etc.) of FIGS. 1 and 6.

As shown in FIG. 8, at block 805, the chaining bit decoder 608 of the multithreaded processor 100 receives an instruction stream. At block 810, the chaining bit decoder 608 selects a group of instructions from the instruction stream (e.g., the instructions 604a-604n in an instruction group 606). At block 815, the chaining bit decoder 608 extracts a designated bit 602 from each instruction (e.g., 604a-604n) of the instruction stream to produce a sequence of chaining bits 602. At block 820, the chaining bit decoder 608 decodes the sequence of chaining bits 602. At block 825, the chaining bit decoder 608 identifies zero or more dependencies between two or more instructions among the selected group of instructions (e.g., the instructions 604a-604n in an instruction group 606) in view of the decoded sequence of chaining bits 602. In an example, an identified dependency between two or more instructions among the selected group of instructions 604a-604n may be a control dependency or a data dependency.

At block 830, the chaining bit decoder 608 outputs control signals (e.g., to the instruction issue controller 610) to cause the one or more pipelines stages 618 to execute the selected group of instructions (e.g., the instructions 604a-604n in an instruction group 606) in view of the identified zero or more dependencies between two or more instructions among the selected group of instructions (e.g., the instructions 604a-604n in an instruction group 606). The sequence of chaining bits 602 may be decoded by the chaining bit decoder 608 without decoding any of the instructions in the selected group of instructions (e.g., the instructions 604a-604n in an instruction group 606).

In an example, the remaining bits in the decoded sequence of chaining bits 602 may indicate to the instruction issue controller 610 that two or more instructions in the selected group of instructions 604a-604n may be executed in parallel by the pipelines stages 618. In another example, the remaining bits in the decoded sequence of chaining bits 602 may indicate to the instruction issue controller 610 that two or more instructions in the selected group of instructions 604a-604n may be executed in series by the pipelines stages 618. In another example, the remaining bits in the decode sequence of chaining bits 602 may indicate to the instruction issue controller 610 that two or more instructions in the selected group of instructions 604a-604n must be executed in parallel by the pipelines stages 618. In another example, the remaining bits in the decoded sequence of chaining bits 602 may indicate to the instruction issue controller 610 that the selected group of instructions may be executed partially in parallel and partially in series by the pipelines stages 618.

In an example, the number of instructions to place in the selected group of instructions 604a-604n may be based on an issue width of the multithreaded processor 100.

In an examples, the chaining bit decoder 608 may be configured to identify intra-group dependencies within the selected group of instruction using the chaining bits 602. Accordingly, at block 835, the chaining bit decoder 608 may divide the selected group of instructions 604a-604n and associated chaining bits 602 into a first group of instructions and a second group of instruction in order to identify intra-group dependencies (e.g., between groups).

At block 840, the chaining bit decoder 608 may identify zero or more dependencies between an instruction of the first group of instructions and an instruction of a second group of instructions selected from the instruction stream based on the decoded sequence of chaining bits 602. At block 845, the chaining bit decoder 608 may output control signals (e.g., to the instruction issue controller 610) to cause the one or more pipelines stages 618 to execute the second group of instructions based on the identified zero or more dependencies between the instruction of the first group of instructions and the instruction of a second group of instructions. In an example, a bit in the decoded sequence of chaining bits 602 may indicate that the first group of instructions may be executed in parallel with the second group of instructions. An identified dependency between one or more instructions of the first group of instructions and one or more instructions of the second group of instructions may be control dependencies or data dependencies.

In an example, one or more bits in a decoded sequence of chaining bits 602 may be operable to optimize performance of the multithreaded processor 100. In an example, the decoded sequence of chaining bits 602 may be operable to function as pipeline control signals for the pipelines stages 618.

Figure 9:
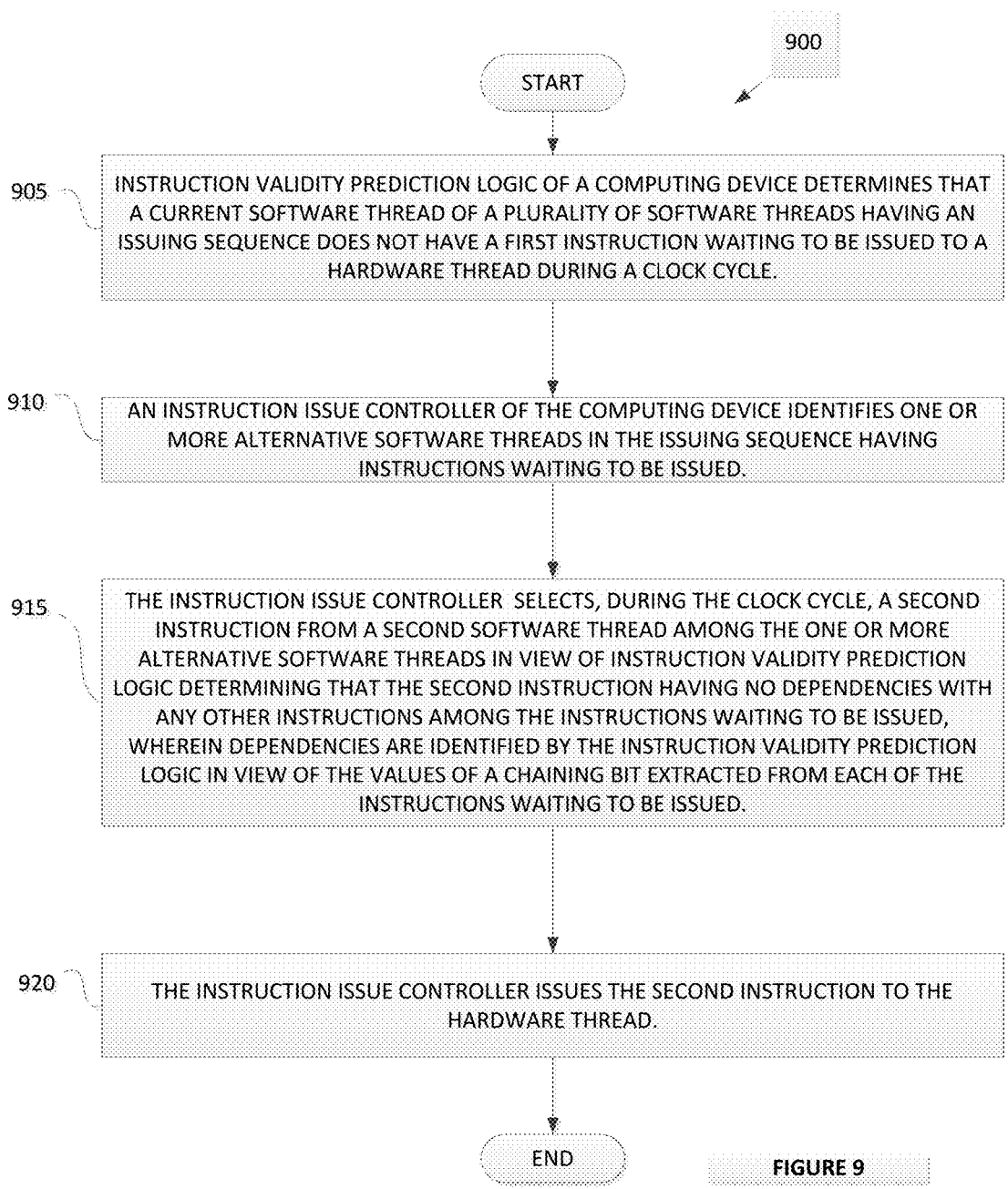
FIG. 9 is a flow diagram illustrating an example of a method for minimizing unused clock cycles in the multi-threaded processor when there are fewer software threads than hardware thread units.

FIG. 9 is a flow diagram illustrating an example of a method 900 for minimizing unused clock cycles in the multithreaded processor when there are fewer software threads than hardware thread units (e.g., 102a-102n). The method 900 may be performed, for example, by the (e.g., multithreaded) computer processor 100 of FIGS. 1 and 6, and may comprise hardware (e.g., circuitry, dedicated logic, programmable logic, microcode, etc.), software (e.g., instructions run on a processing device), or a combination thereof. In one example, the method 900 may be performed by the instruction validity prediction logic 118 and the instruction issue controller 610 of the (e.g., multithreaded) computer processor 100 of FIGS. 1 and 6.

As shown in FIG. 9, to minimizing unused clock cycles in the multithreaded processor 100 when there are fewer software threads than hardware thread units, at block 905, instruction validity prediction logic 118, executing on the multithreaded processor 100 (e.g., a computing device 100), may determine that a current software thread of a plurality of software threads having an issuing sequence does not have a first instruction waiting to be issued to a hardware thread unit (e.g., 102a) during a clock cycle. At block 910, an instruction issue controller 610 of the multithreaded processor 100 may identify one or more alternative software threads in the issuing sequence having instructions waiting to be issued. At block 915, the instruction issue controller 610 may select, during the clock cycle, a second instruction from a second software thread among the one or more alternative software threads in view of the instruction validity prediction logic 118 determining that the second instruction has no dependencies with any other instructions among the instructions waiting to be issued. Dependencies may be identified by the instruction validity prediction logic 118 in view of the values of a chaining bit extracted from each of the instructions waiting to be issued by the instruction issue controller 610. At block 920, the instruction issue controller 610 may issue the second instruction to the hardware thread unit (e.g., 102a).

In an example, the instruction issue controller 610 may assign a first index (e.g., in the thread ID registers 116) to the hardware thread unit (e.g., 102a) corresponding to a position of the second software thread in the sequence. The instruction issue controller 610 may assign a second index (e.g., in the thread ID registers 116) to the hardware thread unit (e.g., 102a) corresponding to the clock cycle. In an example, the instruction issue controller 610 may employ the first index and the second index to identify the second software thread from which the second instruction originally issued. In an example, responsive to the instruction validity prediction logic 118 determining that the current software thread has the first instruction waiting to be issued to the hardware thread unit (e.g., 102a) during the clock cycle, the instruction issue controller 610 may issue the first instruction to the hardware thread unit (e.g., 102a).

In another example, the instruction issue controller 610 may assign a first index (e.g., in the thread ID registers 116) to the hardware thread unit (e.g., 102a) corresponding to a position of the current software thread in the issuing sequence. The instruction issue controller 610 may assign a second index (e.g., in the thread ID registers 116) to the hardware thread unit (e.g., 102a) corresponding to the clock cycle.

In an example, the multithreaded processor 100 may employ the first index and the second index to identify the current software thread from which the first instruction originally issued.

In an example, the issuing sequence may be initially a token-triggered multi-threading sequence. In an example, the number of software threads of the plurality of software threads may be fewer than the number of available hardware thread units.

Figure 10:
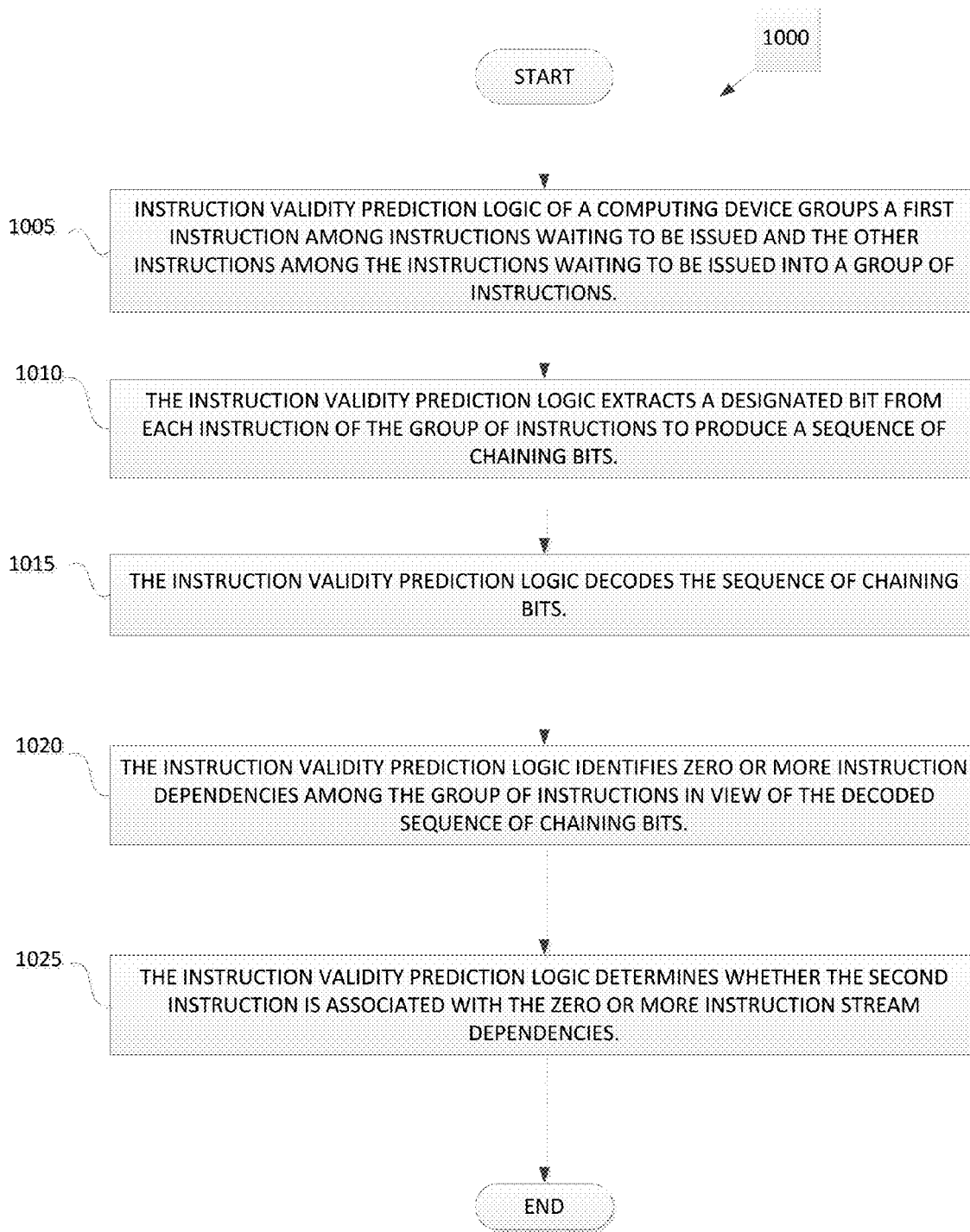
FIG. 10 is a flow diagram illustrating an example of a method for determining whether a second instruction of FIG. 9 has no dependencies with any other instructions among the instructions waiting to be issued.

FIG. 10 is a flow diagram illustrating an example of a method 1000 for determining whether the second instruction of FIG. 9 has no dependencies with any other instructions among the instructions waiting to be issued. The method 1000 may be performed, for example, by the (e.g., multithreaded) computer processor 100 of FIGS. 1 and 6, and may comprise hardware (e.g., circuitry, dedicated logic, programmable logic, microcode, etc.), software (e.g., instructions run on a processing device), or a combination thereof. In one example, the method 1000 may be performed by the instruction validity prediction logic 118 of the (e.g., multithreaded) computer processor 100 of FIGS. 1 and 6.

As shown in FIG. 10, to determining whether the second instruction of FIG. 9 has no dependencies with any other instructions among the instructions waiting to be issued, at block 1005, instruction validity prediction logic 118 executing on the multithreaded processor 100 (e.g., a computing device 100), may group the first instruction and the other instructions among the instructions waiting to be issued into a group of instructions (e.g., the instructions 604a-604n in an instruction group 606). At block 1010, the instruction validity prediction logic 118 may extract a designated bit from each instruction of the group of instructions (e.g., the instructions 604a-604n in an instruction group 606) to produce a sequence of chaining bits 602. At block 1015, the instruction validity prediction logic 118 may decode the sequence of chaining bits 602. The sequence of chaining bits 602 may be decoded without decoding any of the instructions in the group of instructions. At block 1020, the instruction validity prediction logic 118 may identify zero or more instruction dependencies among the group of instructions (e.g., the instructions 604a-604n in an instruction group 606) in view of the decoded sequence of chaining bits 602. In an example, any identified dependency between two or more instructions within the group of instructions may be a control dependency or a data dependency. At block 1025, the instruction validity prediction logic 118 may determine that the second instruction is associated with zero dependencies of the zero or more instruction stream dependencies.

In an example, when the multithreaded processor 100 of FIG. 1 has four hardware thread units (T0-T3), initially, instruction execution may be scheduled as a zeroth software thread to be issued by hardware thread unit T0, followed by a first software thread to be issued by hardware thread unit T1, followed by a second software thread to be issued by hardware thread unit T2 and finally followed by a third software thread to be issued by hardware thread unit T3.

Clock ticks may follow corresponding hardware thread unit subscripts/indices respectively; e.g., the initial clock cycle zero (C0), followed by the first clock cycle (C1), followed by the second clock cycle (C2) and finally followed by the third clock cycle (C3).

In one example, hardware thread units T0, T1, T2 and T3 (e.g., 102a-102d) may issue instructions in the following manner: if hardware thread units T0, T1, T2 and T3 (e.g., 102a-102d) all have software threads assigned to them, then each hardware thread unit T0, T1, T2 and T3 (e.g., 102a-102d) will have an instruction ready and waiting to be issued. Therefore, the instruction issue controller 610 of the multithreaded processor 100 may proceed with the execution as follows: the clock cycles C0, C1, C2, and C3 would be assigned to software threads corresponding to hardware thread units T0, T1, T2 and T3 (e.g., 102a-102d), respectively. In a token triggered multithreaded processor, there would be no need for the thread ID register(s) 116. In this example, the instruction issue controller 610 assigns an identification register and records with each instruction to be issued as $T_{00}$, $T_{10}$, $T_{20}$, and $T_{30}$, respectively.

In another example, the hardware thread units T0, T1, T2 and T3 (e.g., 102a-102d) may issue instructions in the following manner: if there are fewer software threads than hardware thread units 102a-102d, then some of the hardware thread units T0, T1, T2 and T3 (e.g., 102a-102d) will not have instructions to issue. In a token triggered processor, the hardware thread units T0, T1, T2 and T3 (e.g., 102a-102d) would be required to issue NOPs.

If there is a hardware thread unit (e.g. 102a) that does not have instructions ready to issue and other hardware thread units (e.g., 102b, 102c) have valid instruction waiting, then one of other hardware thread units (e.g., 102b, 102c) (e.g., a former hardware thread unit) can occupy the designated clock cycle and issue instructions. In this example, the instruction issue controller 610 consults the chaining bits 602 to determine if any inter-instruction dependencies would prohibit issuing further instructions from a specific software thread. If the chaining bits 602 permit another software thread to issue additional instructions and there are fewer software threads than hardware thread units (e.g., 102a-102d), then the instruction issue controller 610 of the multithreaded processor 100 may issue additional instructions.

Therefore, the instruction issue controller 610 of the multithreaded processor 100 may proceed with the execution as follows: assuming hardware thread unit T1 at clock cycle C1 does not have a valid instruction, but hardware thread unit T0 has valid instructions determined by the instruction validity prediction circuit 118 may employ decoded chaining bits to determine if hardware thread unit T0 may issue additional instructions. If hardware thread unit T0 is permitted to issue, then hardware thread unit T0 issues an additional instruction in clock cycle C1. The additional instruction will be identified as $T_{01}$ and be recorded in the associated identification registers 116.

Figure 11:
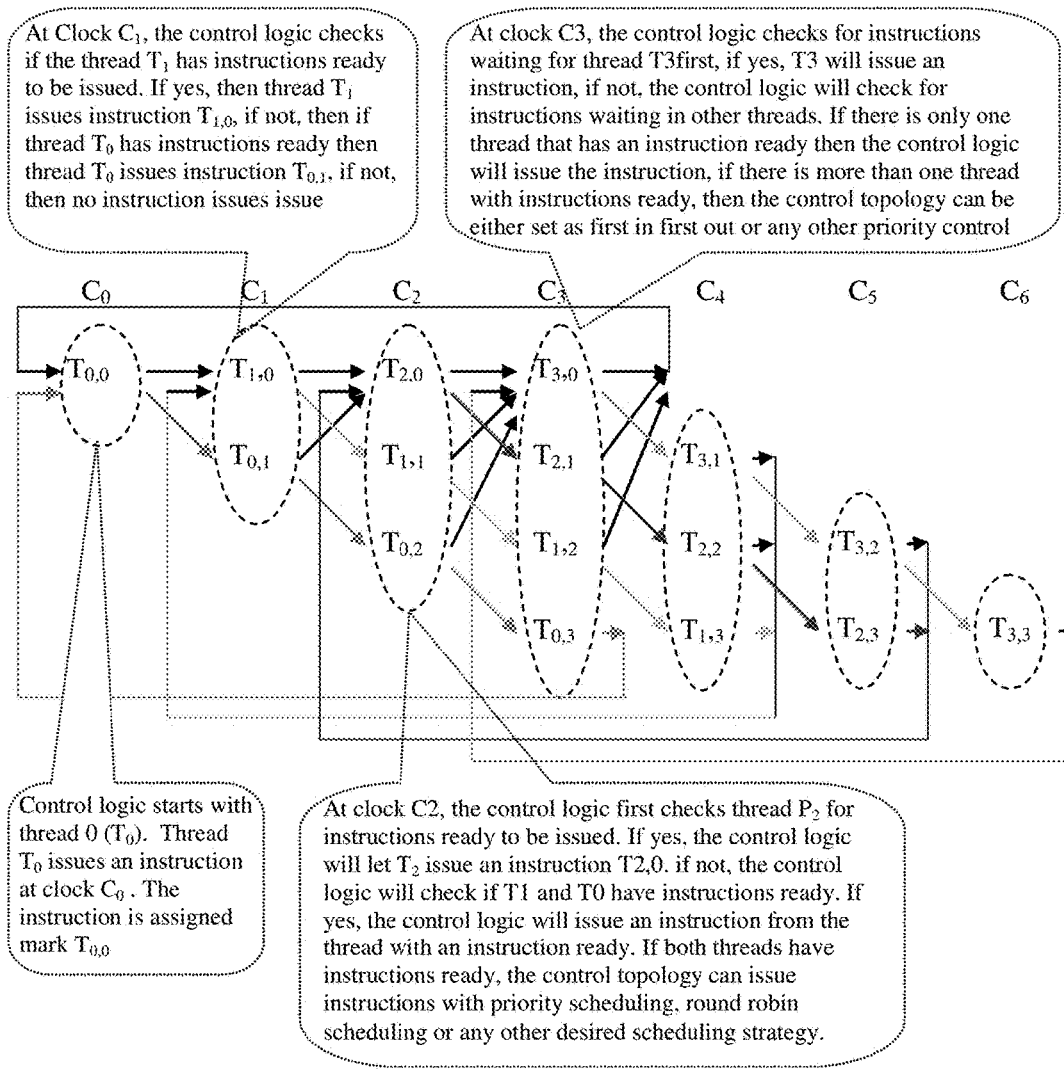
FIG. 11 shows a four-threaded opportunity multithreaded pipeline operation control process timing diagram, where $C_i$ is a clock cycle identifier and $T_{ij}$ is a corresponding assigned thread identifier assigned to the clock cycle $C_i$.

FIG. 11 shows a four-threaded opportunity multithreaded pipeline operation control process timing diagram, where $C_i$ is a clock cycle identifier and $T_{ij}$ is a corresponding assigned thread identifier assigned to the clock cycle $C_i$. One example of opportunity multithreading is described in Chinese patent application No. 201110361140.8 (hereinafter "the '40.8 application), which is incorporated herein by reference in its entirety. On example of instruction chaining is described in U.S. patent application Ser. No. 14/539,104, titled: "Method And Apparatus For Enabling A Processor To Generate Pipeline Control Signals", which is incorporated by reference herein in its entirety. Examples of the present disclosure extend the method and apparatus of the validity predict circuit described in the '40.8 application by employing instruction chaining to identify inter-group instruction dependencies among a group of software threads having instructions waiting to issue.

In the example shown in FIG. 11, control logic begins with hardware thread unit $T_0$. Hardware thread unit $T_0$ issues an instruction at clock cycle $C_0$. The instruction is assigned mark $T_{0,0}$. At clock cycle $C_1$, the instruction issue controller 610 determines whether or not hardware thread unit $T_1$ has instructions ready to be issued. If hardware thread unit $T_1$ has instructions ready to be issued, then hardware thread unit $T_1$ issues instruction $T_{1,0}$. If hardware thread unit $T_1$ does not have instructions ready to be issued, then if hardware thread unit $T_0$ has instructions ready to be issued, then hardware thread unit $T_0$ issues instruction $T_{0,1}$. If neither hardware thread unit $T_0$ nor hardware thread unit $T_1$ have instructions ready to be issued, then no instruction issues (e.g., the multithreaded processor issues a NOP).

At clock cycle $C_2$, the instruction issue controller 610 determines whether hardware thread unit $T_2$ has instructions ready to be issued. If hardware thread unit $T_2$ has instructions ready to be issued, the instruction issue controller 610 will permit hardware thread unit $T_2$ to issue an instruction $T_{2,0}$. If not, the instruction issue controller 610 may determine whether hardware thread unit $T_1$ and/or hardware thread unit $T_0$ have instructions ready to issue. If one of the hardware thread units $T_0$, $T_1$ has instructions ready to issue, the instruction issue controller 610 will issue an instruction from the hardware thread unit with an instruction ready. If both hardware thread units $T_0$, $T_1$ have instructions ready, the control logic can issue instructions with first-in first-out scheduling, priority scheduling, round robin scheduling, or any other desired scheduling strategy.

At clock cycle C3, the instruction issue controller 610 determines whether there are instructions waiting to issue for hardware thread unit $T_3$. If hardware thread unit $T_3$ has instructions ready to be issued, the instruction issue controller 610 will permit hardware thread unit $T_3$ to issue an instruction $T_{2,0}$. If not, the instruction issue controller 610 may determine whether there are instructions waiting to issue in other hardware threads. If there is only one hardware thread unit that has an instruction ready, then the instruction issue controller 610 will issue the instruction. If there is more then one hardware thread unit with instructions ready, then the control logic can issue instructions with first-in first-out scheduling, priority scheduling, round robin scheduling, or any other desired scheduling strategy. Thread instruction issuance proceeds in a similar manner for clock cycles C4, C5, and C6 until all software threads have finished issuing at least one instruction.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:
1. A method comprising:
   extracting a respective bit from a designated bit position of each instruction in a group of instructions;
   encoding the extracted bits to form a sequence of chaining bits associated with the group of instructions, wherein the sequence of the chaining bits comprises a first bit corresponding to an inter-group parallel execution mode;

identifying, by a computing device during a clock cycle, that a first software thread of a plurality of software threads does not include any instructions of the group of instructions waiting to be issued to a hardware thread;

identifying, by the computing device, one or more alternative software threads of the plurality of software threads comprising one or more instructions of the group of instructions waiting to be issued in another clock cycle;

determining, by the computing device, that a second instruction does not include dependencies with any other instructions waiting to be issued in view of the sequence of chaining bits; and issuing, by the computing device in the clock cycle, the second instruction to the hardware thread.

2. The method of claim 1, wherein determining that the second instruction does not include dependencies with any other instructions waiting to be issued comprises:

grouping, by the computing device, the second instruction and the other instructions waiting to be issued into a group of instructions;

decoding, by the computing device, the sequence of chaining bits;

identifying, by the computing device, zero or more instruction dependencies among the group of instructions in view of the decoded sequence of chaining bits; and determining, by the computing device, that the second instruction is associated with no dependencies.

3. The method of claim 2, wherein the sequence of chaining bits are decoded without decoding any of the instructions in the group of instructions.

4. The method of claim 2, wherein an identified dependency between two or more instructions within the group of instructions is one a control dependency or a data dependency.

5. The method of claim 2, further comprising encoding, by the computing device, the designated bit in each instruction with the zero or more dependencies among the group of instructions to produce the sequence of chaining bits.

6. The method of claim 1, further comprising:

assigning, by the computing device, a first index to the hardware thread corresponding to a position of the second software thread in an issuing sequence; and assigning, by the computing device, a second index to the hardware thread in the clock cycle.

7. The method of claim 6, further comprising employing the first index and the second index to identify the second software thread from which the second instruction originally was issued.

8. The method of claim 1, wherein responsive to determining that the first software thread comprises a first instruction waiting to be issued to the hardware thread during the clock cycle, issuing, by the computing device, the first instruction to the hardware thread.

9. The method of claim 1, further comprising:

assigning, by the computing device, a first index to the hardware thread corresponding to a position of the first software thread in an issuing sequence; and assigning, by the computing device, a second index to the hardware thread corresponding to the clock cycle.

10. The method of claim 9, further comprising employing the first index and the second index to identify the current software thread from which the first instruction originally was issued.

11. The method of claim 9, wherein the issuing sequence is a token-triggered multi-threading sequence.

12. The system of claim 1, wherein a number of software threads of the plurality of software threads is fewer than a number of available hardware threads.

13. A computing device, comprising:

a memory; and a processing device communicatively coupled to the memory, the processing device comprising:

a plurality of hardware threads; and an instruction issuance controller to:

extract a respective bit from a designated bit position of each instruction in a group of instructions;

encode the extracted bits to form a sequence of chaining bits associated with the group of instructions, wherein the sequence of the chaining bits comprises a first bit corresponding to an inter-group parallel execution mode;

identify, during a clock cycle, that a first software thread of a plurality of software threads does not include any instructions of the group of instructions waiting to be issued to a hardware thread;

identify one or more alternative software threads of the plurality of software threads comprising one or more instructions of the group of instructions waiting to be issued in another clock cycle;

determine that a second instruction does not include dependencies with any other instructions waiting to be issued in view of the sequence of chaining bits; and issue, in the clock cycle, the second instruction to the hardware thread.

14. The system of claim 13, wherein to determine that the second instruction does not include dependencies with any other instructions waiting to be issued, the instruction issuance controller is further to:

group the second instruction and the other instructions waiting to be issued into a group of instructions;

decode the sequence of chaining bits;

identify zero or more instruction dependencies among the group of instructions in view of the decoded sequence of chaining bits; and determine that the second instruction is associated with no dependencies.

15. The system of claim 13, wherein the sequence of chaining bits are decoded without decoding any of the instructions in the group of instructions.

16. The system of claim 13, wherein an identified dependency between two or more instructions within the group of instructions is one a control dependency or a data dependency.

17. The system of claim 13, wherein the control logic is further to encode the designated bit in each instruction with the zero or more dependencies among the group of instructions to produce the sequence of chaining bits.

18. The system of claim 13, further comprising at least one of a two-dimensional group identity register or an independent group identity register, wherein the instruction issuance controller is further to:

assign, to the at least one of the two-dimensional group identity register or an independent group identity register, a first index to the hardware thread corresponding to a position of the second software thread in the sequence; and assign, to the at least one of the two-dimensional group identity register or an independent group identity register, a second index to the hardware thread in the clock cycle.

19. The system of claim 18, wherein the processing device is further to employ the first index and the second index to identify the second software thread from which the second instruction originally was issued.

20. The system of claim 18, wherein at least one of the two-dimensional group identity register or the independent group identity register is to track an execution state of at least one of the current software thread or the one or more alternative software threads at a pipeline stage of a pipeline.

21. The system of claim 13, wherein responsive to determining that the first software thread comprises a first instruction waiting to be issued, the processing device is further to:

issue the first instruction to the hardware thread.

22. The system of claim 13, wherein a number of software threads of the plurality of software threads is fewer than a number of hardware threads of the plurality of hardware threads.

\* \* \* \* \*